United States Patent [19]

Meyman

[11] Patent Number: 4,648,477
[45] Date of Patent: Mar. 10, 1987

[54] AUTOMATIC TRANSMISSION

[76] Inventor: Usher Meyman, 230 Ocean Pkwy., Brooklyn, N.Y. 11234

[21] Appl. No.: 535,745

[22] Filed: Sep. 26, 1983

[51] Int. Cl.$^4$ .............................................. B60K 7/00
[52] U.S. Cl. .................................. 180/308; 192/3.25; 192/58 A
[58] Field of Search ................................. 180/307–308; 403/1; 415/159–160, 149 R; 192/3.25, 49, 58 A

[56] References Cited

U.S. PATENT DOCUMENTS

| | | | |
|---|---|---|---|
| 403,584 | 12/1933 | Cornell, Jr. ............................... | 403/1 |
| 665,754 | 1/1901 | Preston .................................. | 415/149 |
| 1,680,775 | 8/1928 | Faber .................................... | 415/149 |
| 2,271,919 | 2/1942 | Jandasek ............................... | 192/3.25 |
| 2,747,429 | 5/1956 | Butler ................................... | 180/308 |
| 2,805,818 | 9/1957 | Ferri ..................................... | 415/160 |
| 4,484,857 | 11/1984 | Patin .................................... | 415/149 R |

FOREIGN PATENT DOCUMENTS 706107  11/1930  France ................................ 415/160

Primary Examiner—John J. Love
Assistant Examiner—Eric D. Culbreth
Attorney, Agent, or Firm—Ilya Zborovsky

[57] ABSTRACT

An automatic transmission has at least one wheel member provided with a plurality of turnable blades and vane members located between discs of the wheel and connected by a turning mechanism. Each of the blades is turnable about an axis of a curved surface which describes the respective blade.

4 Claims, 11 Drawing Figures

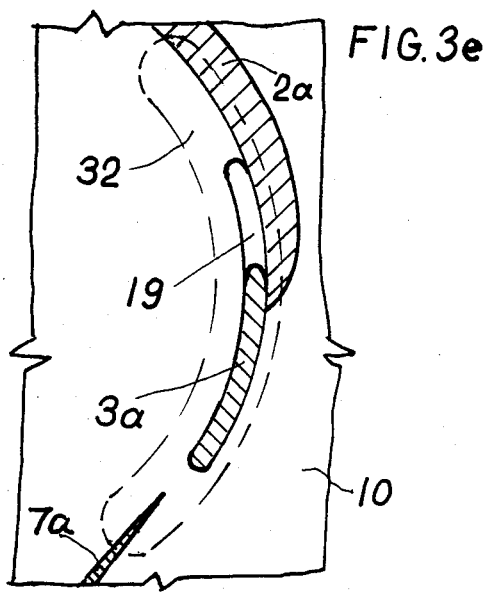
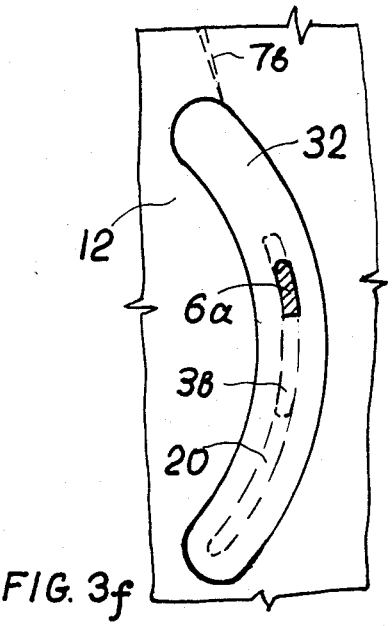
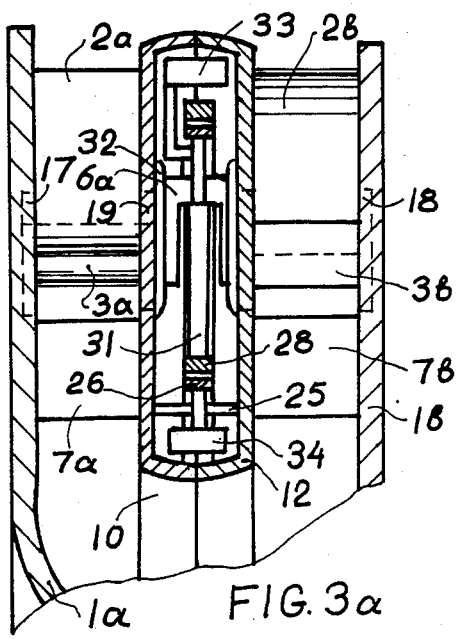
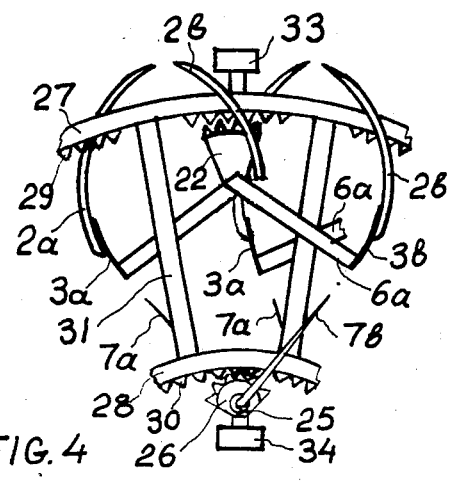
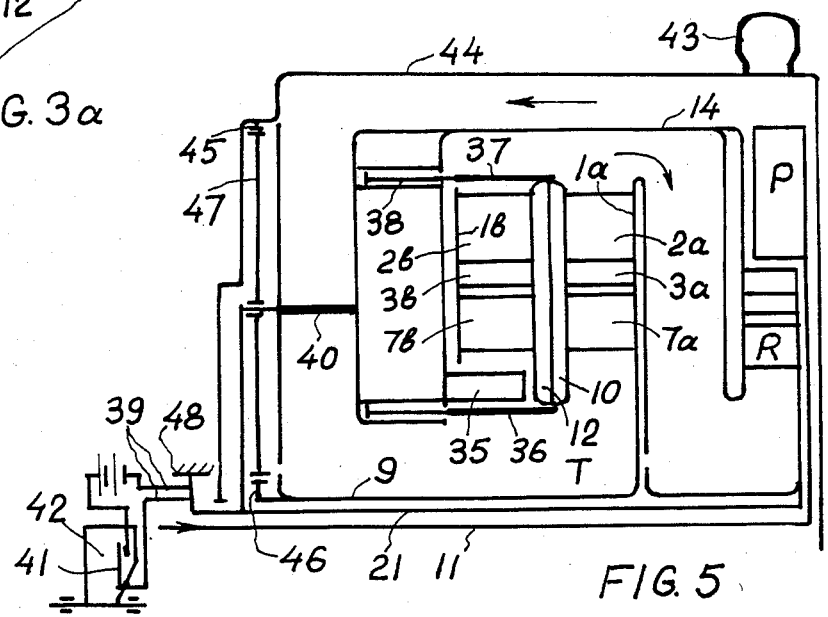

AUTOMATIC TRANSMISSION

BACKGROUND OF THE INVENTION

The present invention relates to an automatic transmission.

Hydrodynamic transmission is known from U.S. Pat. No. 2,271,919 which has a triple or toroidal flow circuit including three centrifugal and three cetripetal flow passages, and each stage of a two-stage turbine as well as a reactor are arranged separately in the three centripetal flow passages. Working wheels of the transmission are provided with turnable blades with axes extending through the blades bodies. The blades are controlled automatically by the flow with the aid of vane members located forwardly of the blades and acting so as to urge the front edges of the blades to assume a position which is parallel to the incoming flow. However, when operational condition changes, a resultant forces acting upon two arms of the blades changes non-equally. This produces a torque which tends to turn the blades and the vane members connected therewith in one or another direction. As a result of this, condition of shock-less circulation of flow is violated. For expanding of high efficiency region, such transmission are supplemented by gear transmission (also for a reverse).

SUMMARY OF THE INVENTION

Accordingly, it is an object of the present invention to provide an automatic transmission which avoids the disadvantages of the prior art.

In keeping with these objects and with others which will become apparent hereinafter, one feature of the present invention resides, briefly stated, in an automatic transmission in which turning blades arranged on at least one wheel are turnable about axes of curved surfaces which describe the turning blades, namely the axes of circular coaxial cylindrical surfaces which describe the turning blades.

The turning blades are arranged in slots and grooves of discs of the wheels, wherein the surfaces of the slots and grooves are coaxial with the cylindrical surfaces of the turning blades.

The turning mechanism of the blades includes a double-rim gear engaging with gear parts connected with the turning blades and vane members.

The turbine is formed two-staged with forward and reverse flow passages and each turning blade of one flow passage is rigidly connected with the turning blade of the other passage by a lever, and each vane member of the one flow passage is fitted on the common axle with the vane member of the other flow passage.

The automatic transmission in accordance with the present invention can be arranged in driving wheels of vehicles.

The novel features of the present invention are set forth in particular in the appended claims. The invention itself, however, both as to its construction and method of operation will be best understood from the following description of preferred embodiment, accompanied by the following drawing.

BRIEF DESCRIPTION OF THE DRAWING

FIGS. 3a, 3b, 3c, 3d, 3e, 3f are views showing fragments of the inventive turbine;

FIG. 4 is a view showing a fragment of a turning mechanism for the turning blades; and FIG. 5 is a diagram of arrangement of the wheel members in a flow circuit.

DESCRIPTION OF PREFERRED EMBODIMENTS

Figure 1:
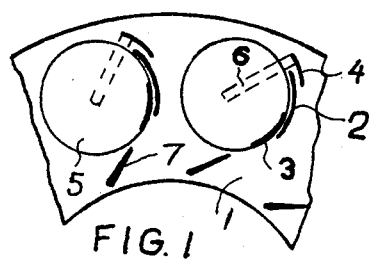
FIG. 1 is a view schematically showing arrangement of turning blades of an automatic transmission in accordance with the present invention.

As can be seen from FIG. 1 a wheel member is composed of a disc 1 and blades 2 rigidly arranged on this disc. Front turning blades 3 and rear turning blades 4 are mounted on discs 5 turnable about their axes, or on levers 6 turnable about the same axes and located under the discs 5 or the disc 1. Each turning blade described by surfaces of circular cylinders whose axes coincide with the axis of the disc 5. Vane members 7 which are oriented by a flow parallel to its direction are located on the disc 1 forwardly of the turning blades 3 and connected therewith by a turning mechanism shown in FIG. 4. The vane members 7 have axles arranged in the openings of the disc 1. Since the working fluid applies onto elementary curved portions of the blade surface elementary forces always normal to these portions in any point, or in other words the elementary forces coincide with the radii of the blade surface, these forces and their resultant extend through the axis of turning of the blade 3 (or 4) and therefore cannot turn the blade about this axis. Therefore the blade does not influence the location of the vane member 7 which as a result of this assumes always a position parallel to the flow and sets this blade so that the flow comes onto it with a zero angle and therefore without shock.

Some influence is caused by hydraulic resistance of the blade 3 which promotes its turning in counterclockwise direction and prevents its turning in clockwise direction. However, this influence can also be eliminated by arrangement of the turning blades 4, united with the vane members 7 and the blades 3 with a common turning mechanism. Since the blades turn simultaneously but in opposite directions, the influence of their hydraulic resistances are mutuslly compensated.

Figure 2:
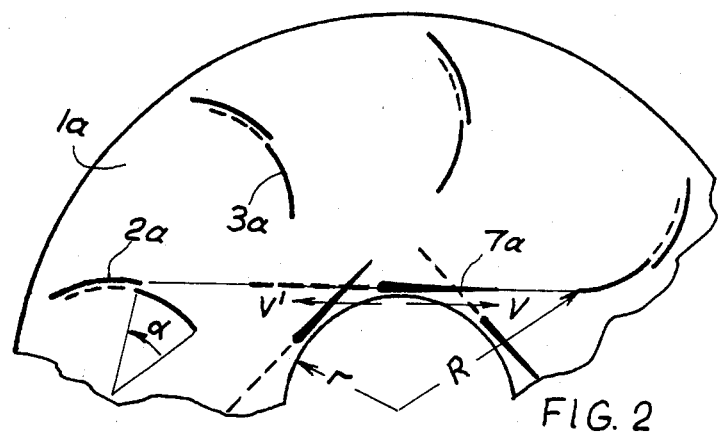
FIG. 2 is a view showing a position of vane members and turning blades during different flow directions at an entrance of wheel member.

The above described system of turning blades can be used for wheels of various types, which can be arranged in any parts of flow circuit. With the present invention, it is of great interest to arrange them in centrifugal parts of the flow circuit as shown in FIG. 2. Theoretically, the flow can enter the wheel, for example into a braked turbine, at an endlessly high number of revolutions of the pump tangentially to a circumference of an inlet opening having a radius r, and change its direction by a maximum angle 180°, which is only theoretically possible at overrunning modes with an endlessly high number of revolutions of the turbine. If the front edges of the blades 3a were located on the inlet circumference, then for providing a shockless entering, these blades would have to be also turned by 180°. However, if the front edges of the blades 3a are located on a greater radius R and the flow enters along a tangent V to the front edge of the blades 3a, then in the event of change of the direction by 180° the flow will have a direction V' which is tangential to the blades 3a in their position shown in broken lines. In this case it is necessary for the shockless entering to turn the blades 3a only by insignificant angle α which decreases with the decrease of the ratio r/R. In real condition the flow cannot enter the wheel along a tangent to its inlet opening, thus it changes within the narrower limits than 180°. Therefore the required range of turning angles of blades, with other equal conditions, is even smaller and embraces all possible modes of operations, from stopping to overrunning. Positioning of the vane members 7a in front of the turning blades 3a does not worsen the ratio r/R, since the vane members 7a do not change the direction of flow which has entered the wheel.

Figure 3:
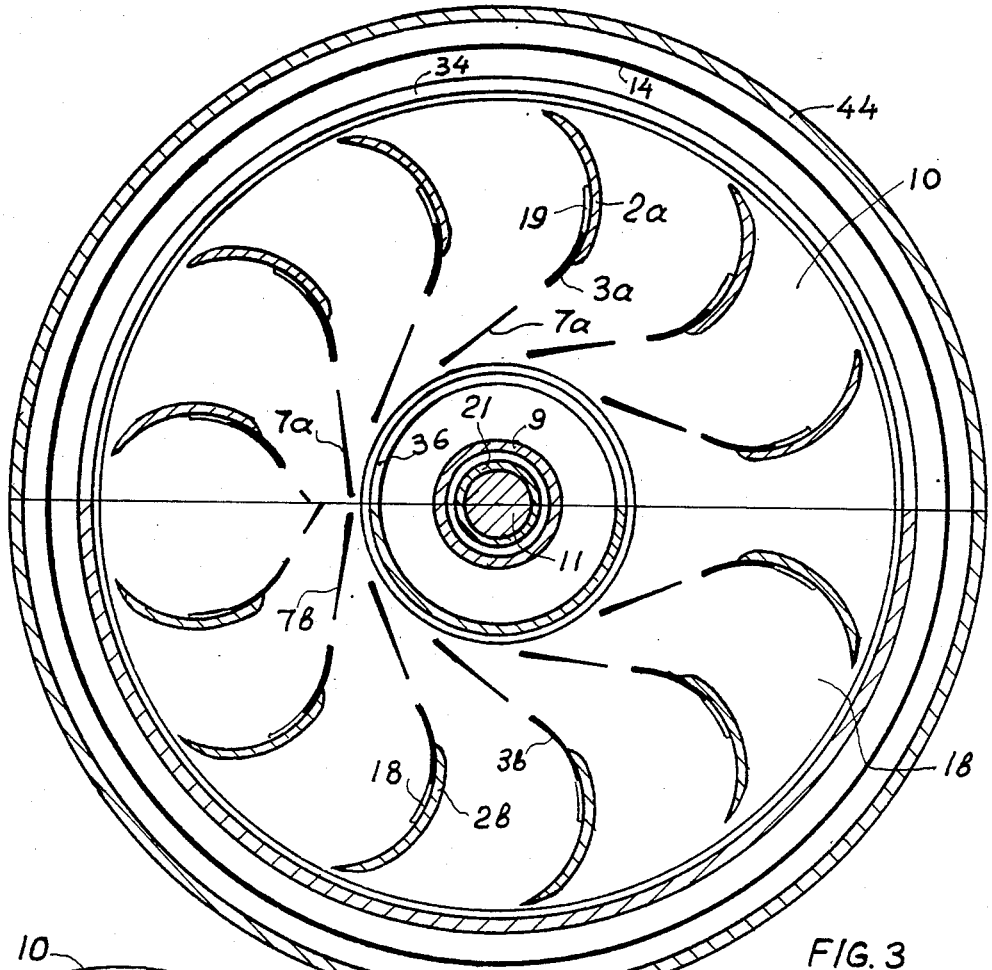
FIG. 3 is a cross sectional view through the wheel member of a turbine, in the upper half -through its passage of a forward stroke, and in the lower half -through its passage of a reverse stroke.
Figure 3B:
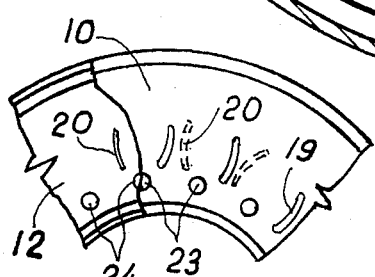
Figures 3C, 3D:
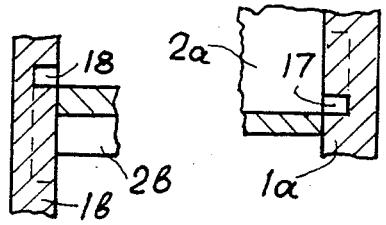

Another modification of the working wheel, a turbine, is shown in FIGS. 3a 3f and 4. Discs 1a and 10 are fixedly connected with each other by stationary blades 2a of a passage of a forward drive, whereas discs 12 and 1b are fixedly connected with each other by blades 2b of a passage of a reverse drive. Therefore the blades 2a and 2b turn together with the discs 1a, 10, 12 and 1b or in other words with the turbine. Turnable blades 3a of the forward drive and turnable blades 3b of the reverse drive are freely set in grooves 17 and 18 of the discs 1a and 1b and in through slots 19 and 20 of the discs 10 and 12. In other words, the turning blades 3a of the forward drive are arranged in the grooves 17 of the disc 1a and in the slots 19 of the disc 10, whereas the turning blades 3b of the reverse drive are arranged in the slots 20 of the disc 12 and the grooves 18 of the disc 1b. Concave and convex surfaces of the turning blades, a concave surface of at least fromt part of the stationary blades, and also concave and convex surfaces of the grooves and slots are formed by surfaces of circular coaxial cylinders. For improving the stream-lining, the front and rear edges of the turning blades can be described differently. The turning blades may be made thin.

Each pair of the turning blades including the turning blade 3a of the forward drive and the turning blade 3b of the reverse drive described by common for this pair coaxial cylindrical surfaces is rigidly connected with one another by a V-shaped lever 6a. The levers 6a are provided with toothed gears or sectors 21 which have axes coinciding with the axes of the above-mentioned cylinders. The arms of the levers 6a are located at two levers which are parallel to the discs of the turbine, that provides for a freedom of turning of the levers by a required angle with a sufficiently great number of blades.

The grooves 17 and 18 and the slots 19 and 20 serve as supports and guides for turning of the blade pairs about axes of the cylindrical surfaces which describe them. In other words, these blades slide in the grooves and slots and can turn in the turbine. At the same time, they turn together with these discs, i.e. with the turbine about the axis of the transmission. However, the levers can also be provided with trunnions (not shown) arranged on the discs 10 and 12. Vane members 7a and 7b are located forwardly of the turning blades 3a and 3b and fixedly fitted on axles 25 provided with toothed gears or sectors 26. The position of the turning blades on the discs of the turbine is determined either by the position of the vane members 7a of the forward drive, or the vane members 7b of the rearward drive, depending on a passage (of the forward drive or of the rearward drive) in which the liquid flows. The axles 25 extend through openings 23 and 24 formed respectively in the discs 10 and 12.

A mechanism of turning the blades, which can also be used in one-flow working wheels including a reactor, is shown in FIG. 4 and in addition to the above mentioned levers 6a, gear sectors 22 and 26, also includes two rings 27 and 28 which have toothed segments or rims of internal gearings 29 and 30 engaged respectively with the toothed sectors 22 and 26. the rings 27 and 28 are rigidly connected by spokes 31. The ratios are selected so that during turning of the vane members by the flow which changes the direction the turning blades are turned by a necessary angle and their input front parts remain parallel to the vane members, i.e. to the flow flowing in the respective flow passage of the turbine.

The discs 19 and 12 are rigidly connected with one another by any conventional means. For example, their separation (axial displacement) is prevented by the vane members 7a and 7b, since the latter are fixedly fitted on the common axle 25. Thereby both passages of the turbine turn jointly. The levers 6a are provided with sealing elements 32 which have the shape of segments and during sliding with the blades 3a and 3b continuously overlap the slots 19 and 20 in the discs 10 and 12. The sealing elements 32 can be formed of one piece with the levers or separately therefrom and can be spring-biased. Increased pressure in the activated flow passage, which is transferred into space between the discs 10 and 12, and decreased pressure because of the ejecting effect in the other flow passage press the respective sealing elements against the slots of the discs of the second flow passage and they prevent overflow of the working liquid. Each pair of blades 3a and 3b together with the lever 6a in the position shown in FIG. 4 is in condition of unstable equillibrium during rotation of the turbine. If the working fluid which flows in one of the flow passages turns the respective vane member so as to displace the vane member pair and therefore the blade pair from this medium position, then the blades will have a tendency to turn even more, but the centrifugal forces acting upon the vane member pair will prevent increase of turning. For complete elimination of influence of the centrifugal forces their moment in the vane member pair must be smaller than in the blade pair with the lever, as many times as the ratio of the turning mechanism. However, each pair of blades with the lever, as well as each pair of vane members can be dynamically balanced by providing masses 33 and 34.

The turning blades are loaded by a certain part of the working torque. Other elements of the regulating system of the turning mechanism do not transfer working loads. Because of this, they can be manufactured from plastics.

Each working wheel of the transmission can be arranged separately in the centrifugal flow passages of the triple flow circuit for obtaining a minimum possible ratio r/R. However, for reducing the length of the transmission a double flow circuit can be used as shown in FIG. 5 with the installing of a pump P after the reactor R in the same centrifugal flow passage. If in this case the discs of the pump do not have rounded surface which turns the flow in an axial direction, then the pump will not be subjected to the action of axial forces. They are completely compensated in the turbine T and reactor R.

A stationary system of short greatly curved blades 35 can be arranged forwardly of the flow passage of reverse drive of the turbine. In this case the radius r of this flow passage is somewhat increased. However, the required range of turning of the blades remains of an average value since high speeds of a vehicle at the reverse drive are not acceptable. The blades 35 turn the flow laterally toward the side corresponding to the reverse drive, when annular shutters 36 and 37 are displaced to the right by any convenient means, for example by one or two-position hydraulic cylinder-piston units 38 arranged in a thorus. The thorus is fixedly connected with the reactor by means of a cylinder 14. A shaft 11 of the pump is located inside a pipe 21 on which the parts of the reactor are mounted. Pressure supply to the cylinder-piston units is provided by a valve which can be controlled by an electromagnet arranged in the thorus (not shown). Electrical conductors 39 to the electromagnet can be extended through a streamlined rod 40 or through passages provided in the discs of the reactor. A switch 41 can be provided on a gas pedal 42 to close an electrical circuit by turning the foot in clockwise direction. The degree of braking and then the speed of rearward movement are determined by the degree of pressing of the gas pedal. In this case probability of a tragic outcome in cases of accidents is reduced since the time which is usually spent for moving the foot from the gas pedal to the brake pedal is eliminated.

Such a braking system is especially convenient in the case of direct connection of the turbine with a driving wheel, for example in arrangement of the transmission in the driving wheels of vehicles. For this purpose a tire 43 can be set directly on a rotary housing 44 of the transmission. The transmission can be provided with a mechanical transmission, for example with a planetary reducer. A toothed rim of an internal gearing 45 is fixed on the housing 44, a central toothed gear 46 is rigidly connected with a hollow shaft 9 of the turbine, and axles of pinions 47 are fixed on the reactor by means of the pipe 21. The reactor is connected with elements of a suspension 48 of the vehicle. The pump and the turbine (and also the working fluid at the high numbers of revolution of the turbine) rotate in a direction which is opposite to the direction of rotation of the wheel of the vehicle. Because of this, gyroscopic moments generated in them during turning counteract the gyroscopic moments of the wheel, and as a result of this the stability of the vehicle during turns is increased.

The invention is not limited to the details shown since various modifications and structural changes are possible without departing from the spirit of the present invention.

What is desired to be protected by Letters Patent is set forth in the appended claims.

I claim:

1. An automatic transmission, comprising a plurality of wheel members each having discs defining an inner space therebetween; a plurality of turnable blades and a plurality of vane members located in said inner space between the discs of at least one of said wheel members, said turnable blades being mechanically connected with said vane members, each of said turnable blades having an inner surface and an outer surface formed by circular cylindrical surfaces having a common axis, each of said turnable blades being turnable about said common axis of the circular cylindrical surfaces forming the inner and outer surfaces of the respective blade; a plurality of levers turnable about said axes and supporting said blades, said discs having a plurality of openings extending coaxially with the surfaces which describe said blades, said blades being partially received in said openings of said discs; and a housing accommodating said wheel members and said turnable blades and said vane members.

2. An automatic transmission, comprising a plurality of wheel members each having discs defining an inner space therebetween; a plurality of turnable blades and a plurality of vane members located in said inner space between the discs of at least one of said wheel members, said turnable blades being mechanically connected with said vane members, each of said turnable blades having an inner surface and an outer surface formed by circular cylindrical surfaces having a common axis, each of said turnable blades being turnable about said common axis of the circular cylindrical surfaces forming the inner and outer surfaces of the respective blade; a plurality of gear parts each provided on a respective one of said blades and said vane members; a double rim gear engaging with said gear parts of said blades and said vane members; and a housing accommodating said wheel members and said turnable blades and said vane members.

3. An automatic transmission, comprising a plurality of wheel members each having discs defining an inner space therebetweeen; a plurality of turnable blades and a plurality of vane members located in said inner space between the discs of at least one of said wheel members, said turnable blades being mechanically connected with said vane members, each of said turnable blades having an inner surface and an outer surface formed by circular cylindrical surfaces having a common axis, each of said turnable blades being turnable about said common axis of the circular cylindrical surfaces forming the inner and outer surfaces of the respective blades, said wheel member forming a turbine with a forward flow passage and a reverse flow passage, said turnable blades and said vane members including a first group of blades and vane members of said forward flow passage and a second group of blade and vane members of said reverse flow passage, each blade of said first group being rigidly connected with a respective one of the blades of said second group, each vane member of said first group being rigidly connected with a respective one of the vane members of said second group.

4. An automatic transmission as defined in claim 3; and further comprising a plurality of levers each rigidly connecting one blade of said first group with the respective one blade of said second group, and a plurality of axles each provided for the vane member of one of said groups and rigidly supporting the respective one vane member of the other of said groups.

* * * * *